(12) United States Patent
Ishikawa (10) Patent No.: US 7,094,172 B2
(45) Date of Patent: Aug. 22, 2006

(54) DIFFERENTIAL AND DIFFERENTIAL SYSTEM

(75) Inventor: Yasuhiko Ishikawa, Tochigi (JP)

(73) Assignee: Tochigi Fuji Sangyo Kabushiki Kaisha, Tochigi (JP)

( * ) Notice: Subject to any disclaimer, the term of this patent is extended or adjusted under 35 U.S.C. 154(b) by 53 days.

(21) Appl. No.: 10/903,846

(22) Filed: Jul. 30, 2004

(65) Prior Publication Data
US 2005/0003923 A1    Jan. 6, 2005

Related U.S. Application Data

(63) Continuation of application No. 09/970,957, filed on Oct. 3, 2001, now Pat. No. 6,832,972.

(30) Foreign Application Priority Data

| Oct. 19, 2000 | (JP) | ............................. 2000-319911 |
| Mar. 15, 2001 | (JP) | ............................. 2001-074746 |

(51) Int. Cl.
  *F16H 57/04* (2006.01)
  *F16H 48/06* (2006.01)
  *F16H 48/20* (2006.01)

(52) U.S. Cl. ....................... 475/231; 475/160

(58) Field of Classification Search ........ 475/198–206, 475/160, 231, 159
See application file for complete search history.

(56) References Cited

U.S. PATENT DOCUMENTS

| 3,650,013 | A |   | 3/1972  | Boers et al. |
| 4,819,512 | A | * | 4/1989  | Azuma et al. ................. 475/2 |
| 5,385,513 | A | * | 1/1995  | Ishii et al. ................... 475/203 |
| 5,520,589 | A | * | 5/1996  | Dewald et al. ............. 475/231 |
| 6,474,433 | B1 |  | 11/2002 | Yoshioka |
| 6,770,005 | B1 | * | 8/2004 | Aikawa et al. ................ 475/5 |

FOREIGN PATENT DOCUMENTS

| JP | 60001030 A | 11/1985 |
| JP | 02290721 A | 11/1990 |
| JP | 03-118233  | 5/1991 |
| JP | 03-292437  | 12/1991 |

* cited by examiner

*Primary Examiner*—Tisha Lewis
(74) *Attorney, Agent, or Firm*—Morrison & Foerster LLP (57) ABSTRACT

The differential includes a differential housing (7A, 7B). A torque transmission member (5A, 5B) is supported to a differential housing (7A, 7B) for rotating relative to the differential housing. A clutch system (13A, 13B) is configured to interconnect between the torque transmission member (5A, 5B) and the differential housing (7A, 7B) for transmitting a drive torque therebetween.

18 Claims, 6 Drawing Sheets

DIFFERENTIAL AND DIFFERENTIAL SYSTEM

CROSS-REFERENCE TO RELATED APPLICATION

This application is a continuation of application Ser. No. 09/970,957, filed on Oct. 3, 2001, now U.S. Pat. No. 6,832,972, the entire contents of which are hereby incorporated by reference in this application.

BACKGROUND OF THE INVENTION

The invention relates to a differential and a differential system adapted for a four-wheel drive vehicle and, more specifically, to ones adapted for a vehicle mutually switchable between four-wheel drive and two-wheel drive.

Conventionally, a drive force transmission with a differential of Japanese Patent Application Laid-Open Publications No. 3-118233 and NO. 3-292437 are known.

The drive force transmission is located to a rear wheel drive system in a four-wheel drive system. The transmission has a differential with a rotatable differential housing. The transmission includes a ring gear member for the transmission of a drive force to the casing.

SUMMARY OF THE INVENTION

The ring gear member, however, is rotatably supported to another member such as a shaft, not the differential housing. During two-wheel drive, the sliding of the ring gear member on the differential housing or the shaft results in sliding resistance. This causes seizing and galling to generate drive resistance as drag torque for the reduction of the fuel cost of the engine.

It therefore is an object of the present invention to provide a differential and a differential system in which drive resistance reduces remarkably.

To achieve the object, a first aspect of the invention provides a differential. The differential includes a differential housing. The differential includes a torque transmission member supported to the differential housing for rotating relative to the differential housing. The differential includes a clutch system configured to interconnect between the torque transmission member and the differential housing for transmitting a drive torque therebetween.

The differential includes a non-limited slip differential and a limited slip differential (LSD). The LSD includes a corn-clutch type, a multiplate-clutch type, or a parallel-axis type.

Preferably, the differential further includes a support member located between the torque transmission member and the differential housing. The support member supports the torque transmission member to the differential housing for rotation.

The support member includes a bearing, a roller, and a ball. The bearing includes a ball bearing and a slide bearing.

Preferably, the support member and the clutch system are axially arranged each other.

Preferably, the torque transmission member has a gear located in radial alignment with the support member.

Preferably, the clutch system includes a first clutch provided between the torque transmission member and the differential housing. The clutch system includes an actuator for operating the first clutch. The first clutch is located axially between support member and the actuator.

The first clutch includes a dog clutch, and a friction clutch. The actuator includes a electromagnet type, and hydraulic type.

Preferably, the support member supports at least two points of the torque transmission member.

Preferably, the torque transmission member axially has an end. The actuator is located at the end. The first clutch is located axially back from the end.

Preferably, the support member is located in alignment with the clutch system.

Preferably, the actuator includes a second clutch for transmitting a drive torque from the torque transmission member. The actuator includes a converter provided between the first and second clutches for converting a drive torque to a thrust force and for engaging the first clutch.

Preferably, the actuator further includes an electromagnet system for engaging the second clutch.

Preferably, the electromagnetic system includes a core. The electromagnetic system includes a rotor located between the core and the second clutch for magnetically conducting therebetween. The rotor is supported on the differential housing.

Preferably, the converter includes a cam mechanism configured to be operated by the second clutch.

Preferably, the second clutch includes first clutch plates connected the torque transmission member, the first clutch plates being spaced each other. The second clutch includes second clutch plates connected to the converter. Respective second clutch plates are slidably interposed between respective first clutch plates.

Preferably, the first clutch plates are spaced radially from the converter.

Preferably, the second clutch plates are spaced radially from the torque transmission member.

Preferably, the electromagnet system includes an armature configured to be attracted for pressing and engaging with the second clutch. The armature is spaced radially from the torque transmission member.

Preferably, the rotor has openings each extending within an angular range. The openings are angularly spaced from each other and are located radially inward of a coil of the electromagnet system.

Preferably, the openings face a core of the electromagnet system.

Preferably, the support member includes bearings arranged in axial alignment with each other.

A second aspect of the invention provides a differential system. The system includes a transmission mechanism for transmitting a drive torque. The system includes a differential. The system includes a torque transmission member supported to the differential for rotating relative to the differential. The system includes a clutch system configured to interconnect between the torque transmission member and the differential for transmitting a drive torque between the transmission mechanism and the differential.

BRIEF DESCRIPTION OF THE ACCOMPANYING DRAWINGS

These and other features, aspects, and advantage of the present invention will be better understood with reference to the following description, appended claims, and accompanying drawings where:

DETAILED DESCRIPTION OF THE PREFERRED EMBODIMENTS

An embodiment of the invention will be explained with reference to drawings.

First Embodiment

Figure 1:
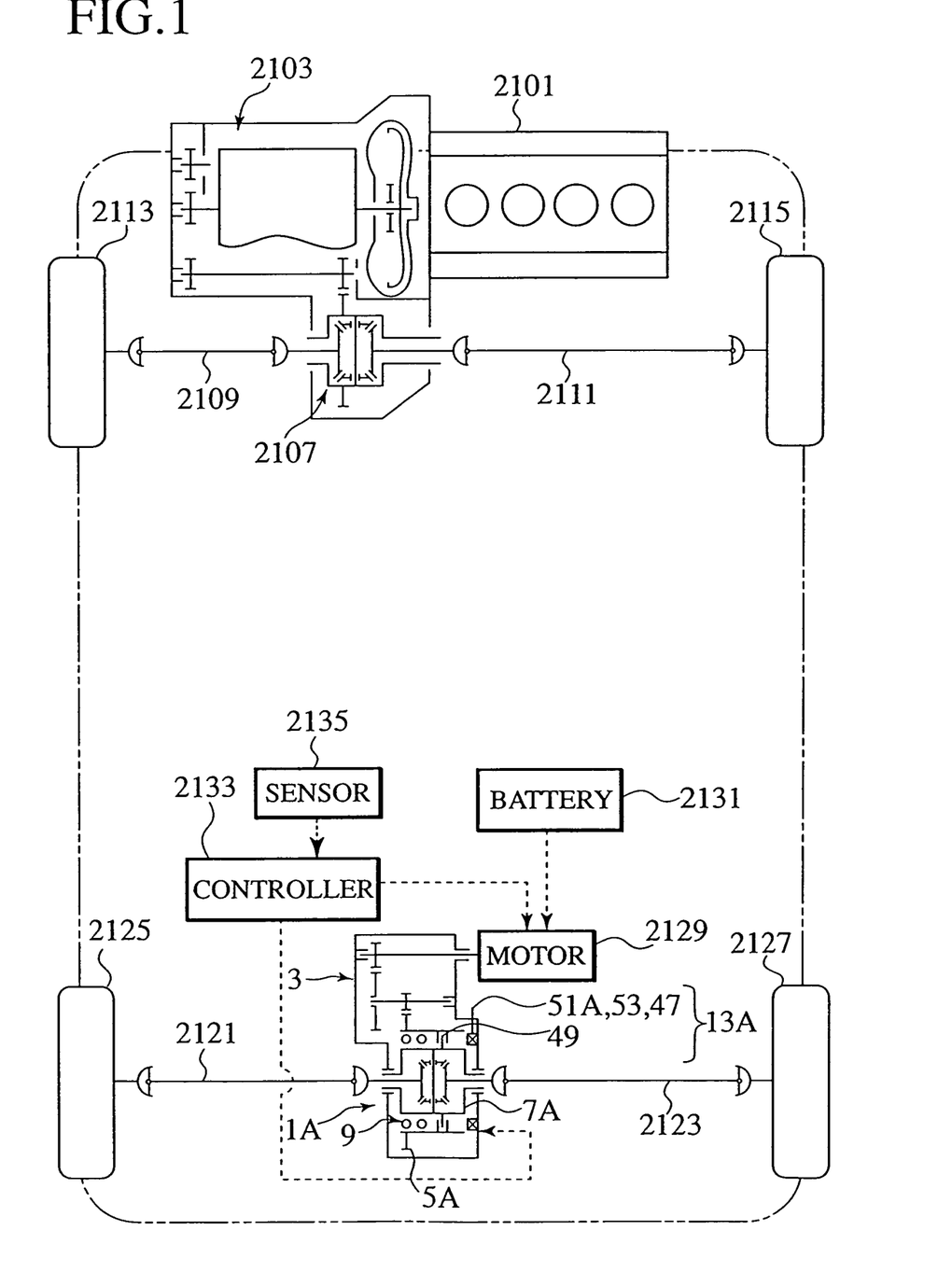
FIG. 1 is a schematic view of a drive train including a differential system according to a first embodiment of the invention, where A1 shows the axis.

As shown in FIG. 1, the embodiment has a differential system mounted on, for example, a hybrid automobile with a four-wheel drive system. The four wheel drive system has a front-wheel drive system and a rear-wheel drive system. Engine 2101 as a primary drive source drives front wheels 2113, 2115. Electrical motor 2129 drives rear wheels 2125, 2127. The differential system includes a rear differential 1A mounted to a rear-wheel drive system for distributing drive torque to left and right rear wheels 2115, 2127. The differential system includes a reduction mechanism 3 connected to rear differential 1A.

The front-wheel drive system has engine 2101 and transmission 2103 linked to each other. Front differential 2107 distributes the drive force from engine 2101 to left and right front wheels 2113 and 2115. Front shafts 2109 and 2111 link the front wheels 2113, 2115 and front differential 2107.

The rear-wheel drive system has motor 2131 linked to reduction mechanism 3. Reduction mechanism 3 connects with ring gear 5A. Ring gear 5A transmits drive force to rear differential 1A. Rear differential 1A and ring gear 5A have clutch system 13A for the connection and disconnection therebetween. Clutch system 13A has clutch 49; and actuators 47, 51, 53 to operate the engagement and disengagement of the clutch 49.

A control system has sensor 2135 for detecting a drive state and generating a signal. The signal causes controller 2133 to generate a control signal. The control signal causes motor 2129 to be driven. Battery 2131 supplies power to motor 2129.

During normal drive, engine 2101 drives front wheels 2113, 2115. As necessary, during, for example, starting, acceleration, or racing of front wheels, the driving of motor 2129 causes the auxiliary driving of rear wheels 2125, 2127.

Figure 2:
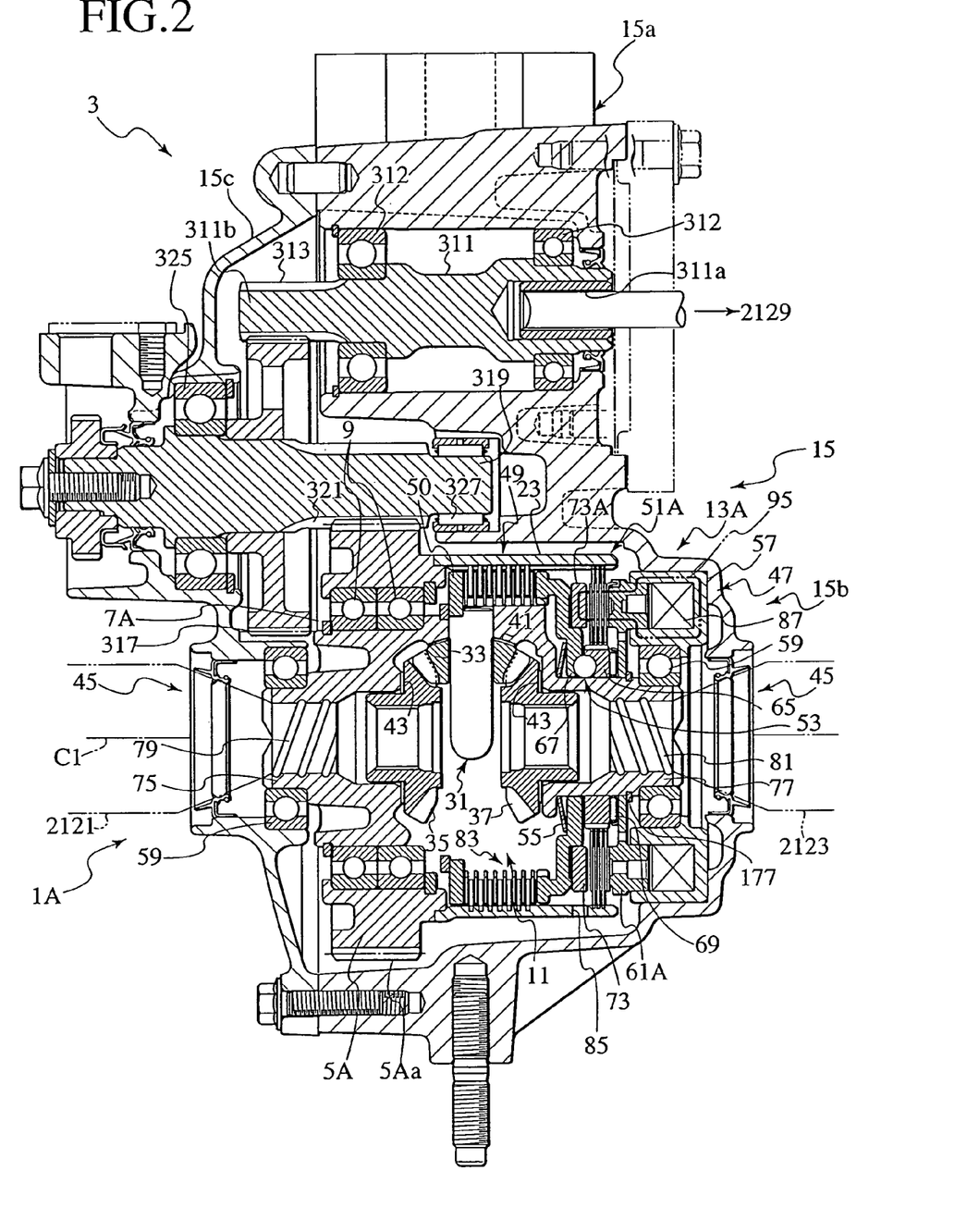
FIG. 2 is a sectional view of a differential system of FIG. 1, where a differential is sectioned along two directions at a right angle from an axis.
Figure 3:
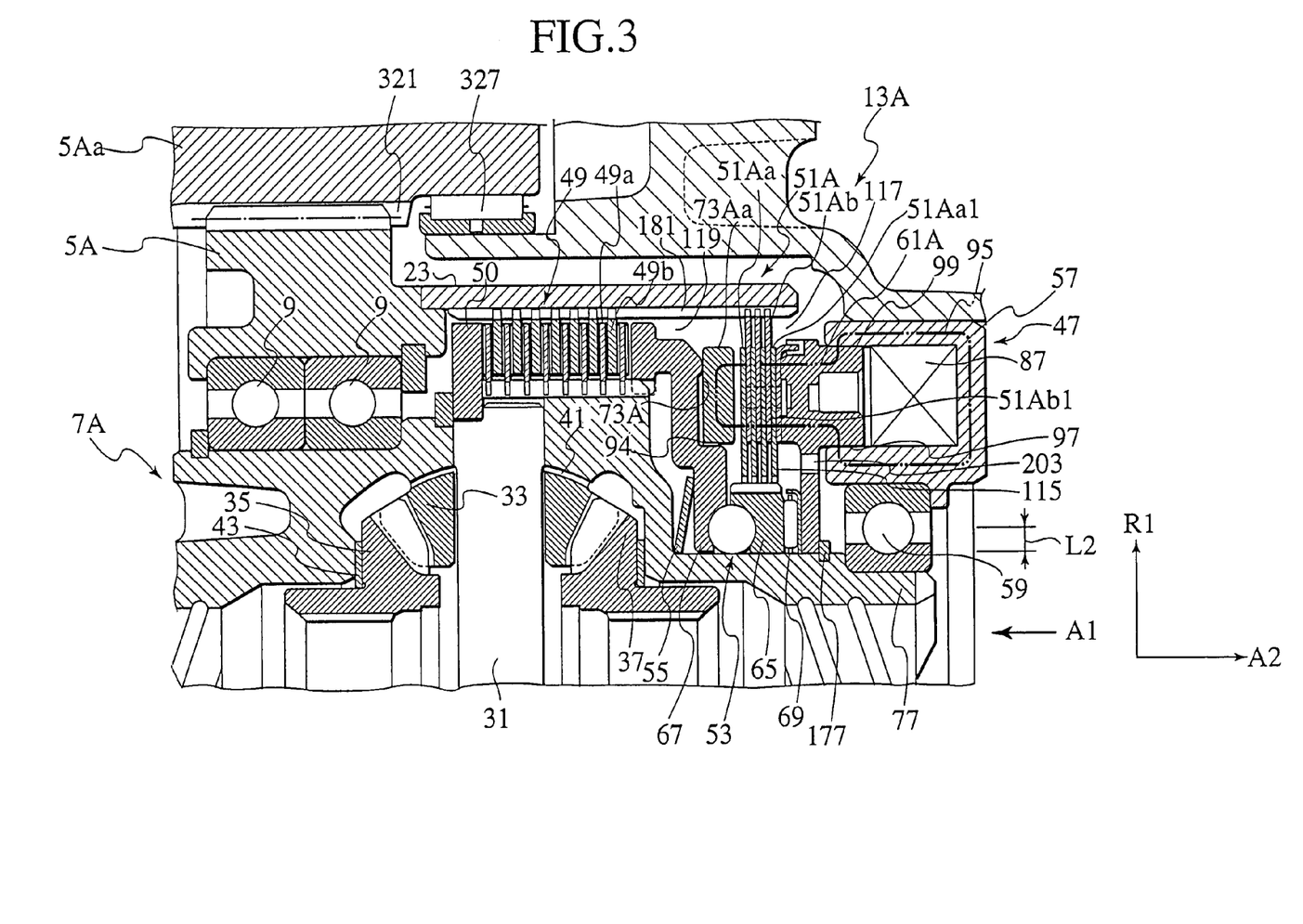
FIG. 3 is an enlarged view of a primary part of a differential of FIG. 2, where R1 shows the radial direction and A2 shows the axis direction.

The width direction of the view of the vehicle using rear differential 1A in FIG. 1 corresponds with the view in FIGS. 2 and 3. The members without reference characters omitted in Figs.

FIG. 2 shows rear differential 1A and reduction mechanism 3.

Rear differential 1A and reduction mechanism 3 are housed in casing 15. Casing 15 includes: gear casing 15a housing reduction mechanism 3; differential casing 15b housing rear differential 1A; and cover 15c fixed to the gear casing 15a and the differential casing 15b for sealing. Casing 15 has an oil sealed therein, with its internal portion forming an oil reservoir.

Reduction mechanism 3 is constituted with two-stepped sets of reduction gears. In addition, reduction mechanism 3 is preferably adaptable to three-stepped sets of reduction gears. Respective sets of reduction gears are constituted with respective small-sized input and large-sized output reduction gears. Reduction mechanism 3 reduces the rotation of motor 2129 in two steps, causing the amplification of torque for the rotation of ring gear 5A.

First and second shafts 311, 319 are arranged in rows in gear casing 15a. Respective sets of transmission gears are composed of a spur gear.

Cylindrical first shaft 311 is rotatably supported to gear casing 15a, using ball bearing 312. One end 311a of first shaft 311 is connected to the output shaft of motor 2129 as an auxiliary drive force for the rear-wheel drive. The first-stepped set of reduction gears has input reduction gear 313 formed around the other end 311b of first shaft 311.

Cylindrical second shaft 319 is rotatably supported to cover 15c, with one end using ball bearing 325 and to gear casing 15a, with the other end using roller bearing 327. Second shaft 319 is fixed to annular output reduction gear 317. Reduction gear 317 extends radially outwardly from second shaft 319. Reduction gears 313, 317 are meshed with each other to reduce the rotational speed of first shaft 311 to be transmitted to second shaft 319.

The second stepped set of reduction gears has input reduction gear 321 formed on second shaft 319. The output gear is ring gear 5A fixed to clutch housing 23 by welding.

Figure 5:
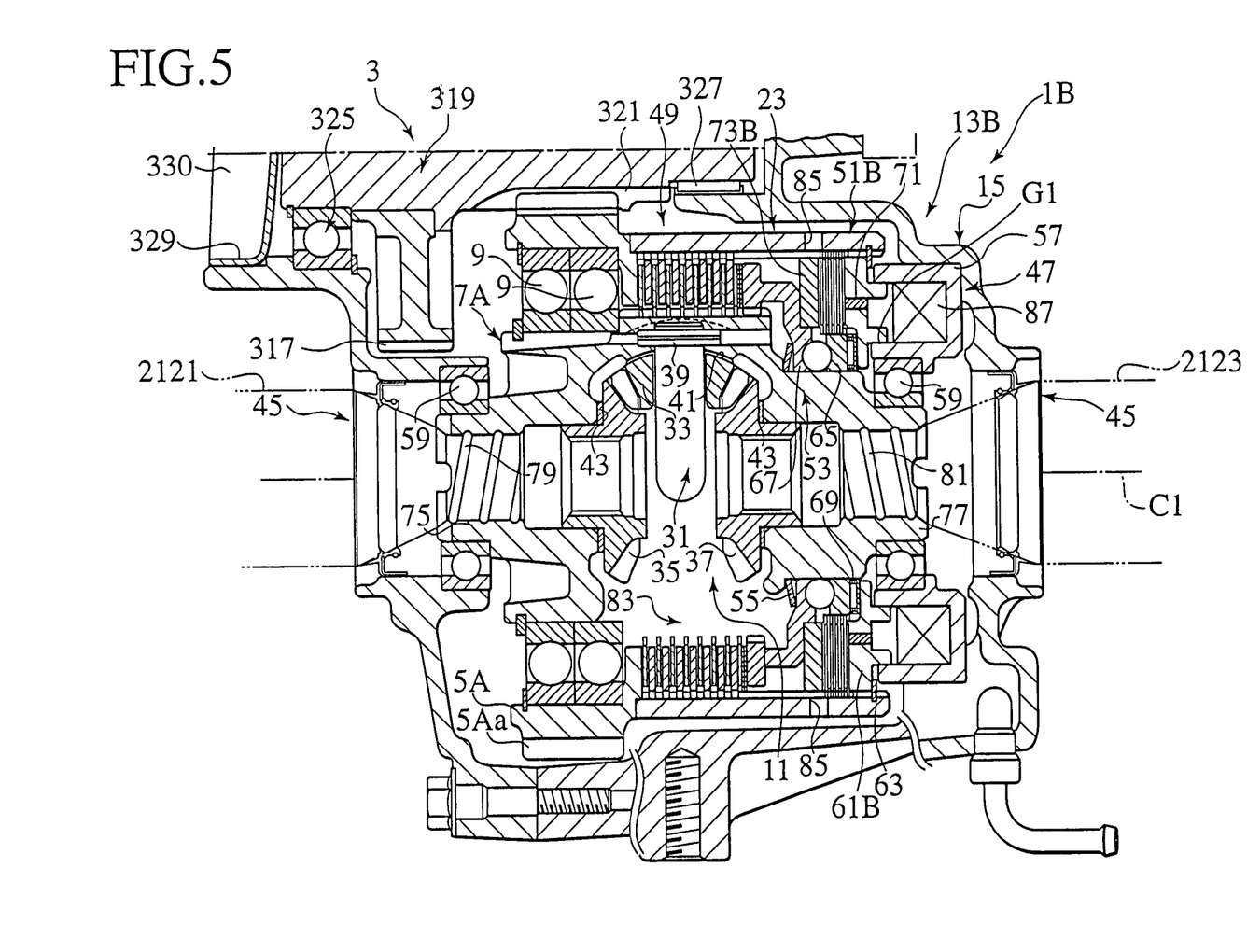
FIG. 5 is a sectional view of a differential according to a second embodiment of the invention, where a differential is sectioned along two directions at a right angle from an axis.

As shown in FIG. 5, casing 15 preferably has an opening 29 provided at the left end of second shaft 319. Mounted to opening 29 is a cover 30 for preventing a foreign material from entering or the leakage of an oil.

Rear differential 1 has differential housing 7A located coaxially with and radially inward of ring gear 5A. Ring gear 5A and differential housing 7A have two ball bearings 9 interposed therebetween. Ring gear 5A is supported to differential housing 7A for relative rotation. Located between differential housing 7A and clutch housing 23 is clutch system 13A. Differential housing 7A has bevel-type differential mechanism 11 located inside thereof.

The gear part 5Aa of ring gear 5A, ball bearings 9, and differential housing 7A are located coaxially and axially overlapping each other.

Gear part 5Aa and ball bearings 9 are arranged in radial alignment with each other, overlapping each other at an axial position. Ball bearings 9 are fixed to ring gear 5A and differential housing 7A, while preferably being mounted to one or both of them, using a spacer.

Left and right drive shafts 2121, 2123 pass through the respective bosses 75, 77 of differential housing 7A, the inner peripheries of which are provided with spiral oil channels 79, 81. Differential housing 7A has opening 83 corresponding with primary clutch 49. Clutch housing 23 has opening 85 therethrough.

Differential mechanism 11 between the left and right wheels is constituted with pinion shaft 31, pinion gear 33, and left and right side gears 35, 37.

Pinion shafts 31 are arranged radially to the axis of differential housing 7A. Respective pinion shafts 31 have ends linked to differential housing 7A. Ring 50 engages pinion shaft 31 and is fixed by a snap ring. The ring 50 stops the rotation or displacement of pinion shaft 31.

Pinion gears 33 are rotatably supported on pinion shafts 31. Differential housing 7A and pinion gears 33 have spherical washers 41 interposed therebetween, which receive a centrifugal force from pinion gears 33 and interlocking reactive force from side gears 35, 37.

Side gears 35, 37 are meshed with pinion gears 33, respectively. Respective side gears 35, 37 and differential housing 7A have thrust washers 43 interposed therebetween, for receiving interlocking reactive force from respective side gears 35, 37.

Side gears 35, 37 are spline linked to left and right drive shaft 2121, 2123 respectively. Respective drive shafts pass outward through casing 15, linking with respective left and right rear wheels, using joints.

Between respective drive shaft 2121, 2123, and the joints or casing 15, oil seals 45 for the preventing an oil form leaking out are interposed.

The drive force of the motor for the rotation of ring gear 5, as described later, is transmitted to differential housing 7A via clutch system 13A. The rotation of differential housing 7A is distributed to respective side gears 35, 37, using pinion gears 33. In addition, the transmission of the rotation of the drive shafts to the left and right wheels causes vehicle to be in four-wheel drive. This remarkably improves the escape and run property on bad roads, the starting, and the acceleration property, and the stability of the vehicle body.

When a difference of the drive resistance of the left and right wheels occurs on a bad road, the rotation of pinion gears 33 distribute the drive force of the motor to the left and right wheels.

Clutch system 13A, as shown in FIG. 3, is constituted with electromagnet 47 as an operator, multiplate-type primary clutch 49 as a first clutch, pilot clutch 51A as a second clutch, ball cam 53 as a converter, return spring 55, and controller 2133.

Electromagnet 47, primary clutch 49, pilot clutch 51A, ball cam 53, and return spring 55 are located coaxially with differential housing 7A. Primary clutch 49 and ball bearings 9 are arranged in axial alignment with each other.

Core 57 of electromagnet 47 is fixed to casing 15, with its lead wire being drawn outside and being connected to battery 2131 and controller 2133 mounted on the vehicle.

The left end of differential housing 7A is supported to cover 15c, using ball bearing 59. The right end is supported to core 57 (casing 15b), using ball bearing 59. Differential housing 7A is rotatable relative to electromagnet 47 and casing 15.

Rotor 61A, made of a magnetic material, fixed on the outer periphery of the right boss 77 of the differential housing, using snap ring 177, thus being axially positioned. Rotor 61A serves as the right wall of housing 23.

Primary clutch 49 is located on the right of ball bearings 9 and between clutch housing 23 and differential housing 7A. Primary clutch 49 has inner plates 49a and outer plates 49b which are slid against each other for frictional clutch. Inner plates 49a are spline linked to differential housing 7A. Inner plates 49a extend radially outward from differential housing 7A, being axially spaced each other at a distance therebetween. Outer plates 49b are spline linked to clutch housing 23. Outer plates 49b extend radially inward, being interposed between inner plates 49a.

Pilot clutch 51A is located between clutch housing 23 and cam ring 65. Pilot clutch 51A has inner plate 51Aa and outer plates 51Ab to be slid against each other for frictional clutch. Inner plates 51Aa are spline linked to cam ring 65. Inner plates 51A extend radially outward from cam ring 65, being spaced at a predetermined distance. Outer plates 51Ab are spline linked to clutch housing 23. Outer plates 51Ab extend radially inward from housing 23, being interposed between inner plates 51Aa.

Ball cam 53 is interposed between cam ring 65 and pressure plate 67. Pressure plate 67 spline links to differential housing 7A, thus being axially movable. As described below, pressure plate 67 receives the cam thrust force of ball cam 53 to press down primary clutch 49.

Interposed between rotor 61A and cam ring 65 is thrust bearing 69 which receives the cam reactive force of ball cam 53.

Return spring 55 is interposed between pressure plate 67 and differential housing 7A, biasing pressure plate 67 against the pressure force of primary clutch 49.

Ring-shaped armature 73A is located between pressure plate 67 and pilot clutch 51A for axial movement. The inner periphery of armature 73A centers around stepped part 94 of pressure plate 67.

Rotor 61A, inner and outer plates 51Aa, 51Ab of pilot clutch 51A, and armature 73A constitute the magnetic path of electromagnet 47. When electromagnet 47 is excited, magnetic loop 95 is generated through the magnetic path.

Provided between rotor 61A and core 57 of electromagnet 47 are air gaps 97, 99 at a spacing forming a part of the magnetic path.

Figure 4:
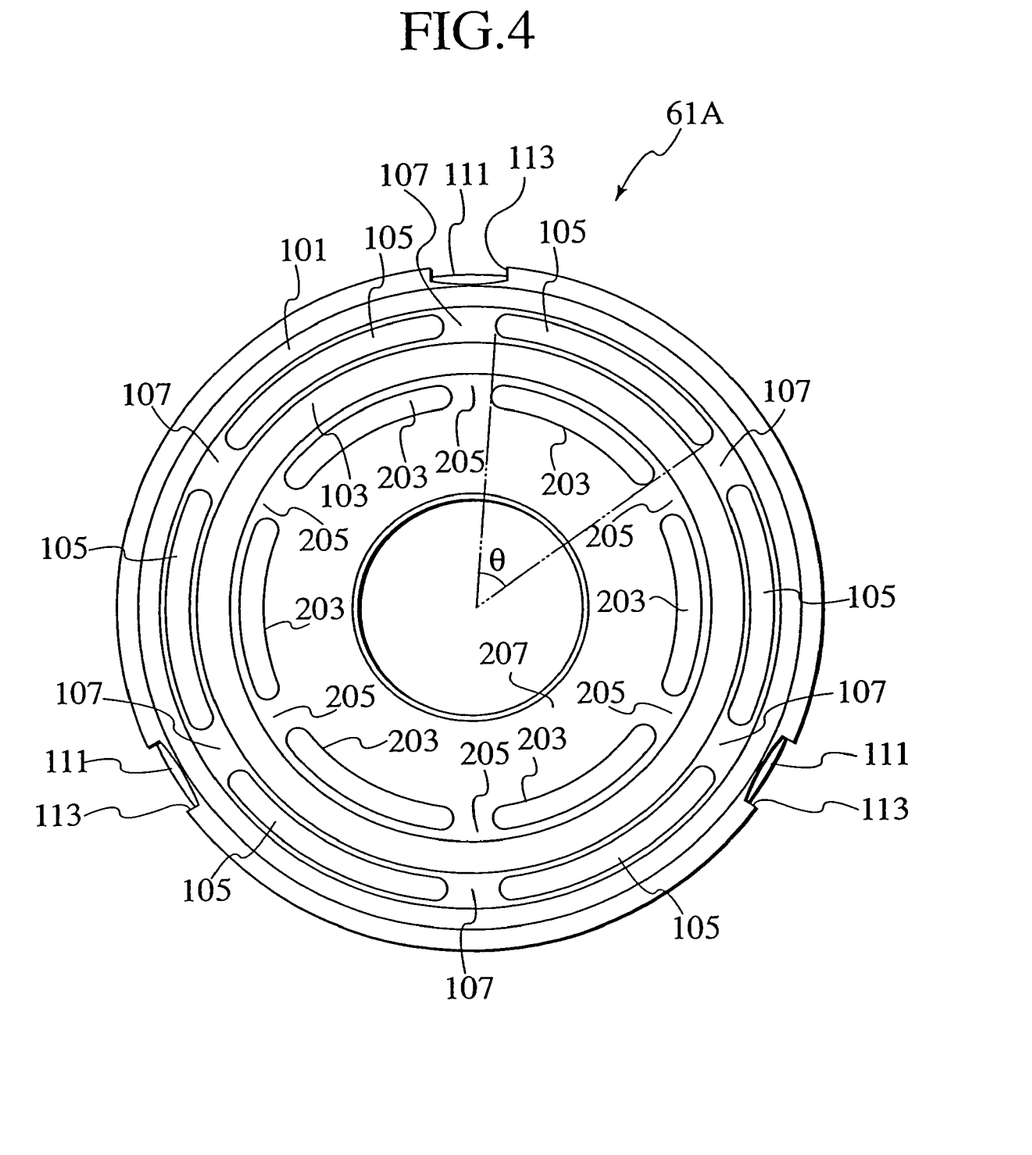
FIG. 4 is an elevational view of a rotor viewed from an arrow A.

Rotor 61A, as shown in FIG. 4, has six arced openings 105 within an angular range θ and with equal radial spacing between the radial outer portions 101 and inner portions 103 as two separate magnetic paths. Provided between respective openings 105 are bridges 107 joining outer portions 101 and inner portions 103 each other, thus constituting a bridge structure.

The openings 105, or the magnetic resistance of air inside openings 105, magnetically insulates between outer portion 101 and inner portion 103. This prevents a short in the magnetic path.

Due to the improvements in prevention from a short in the magnetic path, bridges 107 each have axial recesses formed on both sides thereof, being axially thin, as shown in FIG. 3.

In addition, rotor 61A has six arced openings 105 within ah angular range θ and at equal angular spacing, formed radially inward of magnetic loop 95.

Formed between respective openings 203, are bridges 205 joining openings 203 to each other.

The arrangement of the six openings 203 of rotor 61A in a circular shape causes the outer portion formed with magnetic loop 95 and the inner portion supported on boss 75 of differential housing 7A to be magnetically insulated due to the magnetic resistance of air in openings 203. This prevents the leakage of magnetic force (flux) from magnetic loop 95 to inner portion 207, being different from the conventional art.

Specifically, the embodiment has portions 203 as a generation base of the leakage of magnetic flux, provided closest to rotor 61A and core 57, thus effectively preventing a shorting of the magnetic path.

Openings 203 of rotor 61A as an oil path allow the oil in the oil reservoir of the casing to flow in and out therethrough. This improves the lubricant and cooling functions of pilot clutch 51A, thrust bearing 69, and ball cam 53.

Specifically, an oil is effectively provided to pilot clutch 51A, radially outside respective openings 203, under centrifugal force, thus stabilizing the sliding resistance between outer plates 51Ab and inner plates 51Aa.

In the rear differential 1A, openings 203 prevent magnetic shorts in rotor 61A, by preventing magnetic leakage from magnetic loop 95, thus remarkably improving the magnetic efficiency of electromagnet 47. This reduces the load of the battery and improves the fuel cost of the engine.

In the rear differential 1A, as described above, oil path openings 203 improve the lubricant function of pilot clutch 51A. The stabilization of the cam thrust force of ball cam 65, resulting from the engagement torque of pilot clutch 51A, remarkably improves the control accuracy of the engagement torque of primary clutch 49 (the engine drive force to be transmitted to the rear wheels) and the durability of pilot clutch 51A.

The inner peripheries 51Ab1 of outer plates 51Ab and cam ring 53 are spaced from each other to define a space 115 therebetween. The outer peripheries 51Aa1 of inner plates 51Aa and housing 23 are spaced from each other to define a space 117 therebetween. Housing 23 and the outer periphery 73Aa of armature 73A are spaced from each other to define space 119 therebetween. Respective spaces 115, 117, 119 also contribute the prevention of the short in the magnetic path.

The lower portion of housing 23 is immersed in the oil reservoir provided to the casing. The oil flows from spaces 115, 117, 119 to pilot clutch 51A, the slide portion of armature 73A and pressure plate 67, ball cam 53, thrust bearing 69, primary clutch 49, and ball bearings 9, thus lubricating them.

The oil flows in differential housing 7A through spiral oil channels 79, 81, with the rotation of the casing. The oil lubricates and cools the meshing portion of respective gears and spherical washers 41. The oil receives centrifugal force to flow through the openings to primary clutch 49. The oil lubricates and cools primary clutch 49, ball bearings 9, ball cam 53, pilot clutch 51A, and thrust bearing 69. The oil flows out of space 115, 117, 119 and opening 85 to return to the oil reservoir.

Ball bearings 9 are lubricated and cooled by the oil splash caused the rotation of ring gear 5A.

Coil 87 of electromagnet 47 is cooled by an oil, its property being stabilized. The heat of coil 87 heats the oil in the oil reservoir, the peripheral pilot clutch 51A and ball cam 53.

The controller conducts the excitation of electromagnet 47, the control of excited electric current, and the stop of exciting (demagnetization). The exciting and the stop of exciting cause the motor to be rotated and stopped, respectively.

The rotation of electric motor 2129 causes electromagnet 47 to be excited. When electromagnet 47 is excited, armature 73A is attracted to press against and engage with pilot clutch 51A.

When pilot clutch 51A is engaged, pilot clutch 51A applies the drive force of motor 2129 to ball cam 53 via cam ring 65 and pressure plate 67. While amplifying the drive force, ball cam 53 converts the drive force into a cam thrust force, for the pressing and engaging of primary clutch 49, using pressure plate 67.

When clutch system 13 is engaged, as described above, the rotation of ring gear 5 is transmitted to differential housing 7A. The differential mechanism 11 distributes the rotation to the left and right wheels, causing the vehicle to be in four-wheel drive.

When the excited current is controlled, the change of the slide of pilot clutch 51A causes the change of the cam thrust force of ball cam 53, thus controlling the drive force to be transmitted to the rear wheels.

The control of the drive force, for example, during turning, significantly improves the turning property and stability.

When electromagnet 47 is demagnetized, the disengagement of pilot clutch 51A causes the disappearance of the cam thrust force of ball cam 53. The biasing force of return spring 55 returns pressure plate rightwardly, causing primary clutch 49 to be disengaged. The disengagement of clutch system 13A causes the vehicle to be in two wheel drive with the front wheel drive, using the engine.

At this time, controller 2133, as described above, stops the rotation of electric motor 2129.

When the vehicle starts, controller 2133 causes motor 2129 to be rotated and clutch system 13A to be engaged for four-wheel drive. The drive force of the engine and electric motor reinforce the drive force, improving starting and acceleration properties.

When the speed of vehicle reaches a predetermined value such as 20 km/h, rendering the drive force of the electric motor unnecessary, controller 2133 stops the rotation of motor 2129. This causes clutch system 13A to be disengaged, thus putting the vehicle in two-wheel drive.

The controller causes the vehicle to be in four-wheel drive when climbing a slope. This reinforces the drive force of the vehicle.

If roll back phenomenon, that is the skidding of front wheels causing the backward movement of the vehicle, occurs when climbing of slope, the controller stops the rotation of the electric motor, thus disengaging clutch system 13A.

The disengagement of clutch system 13A causes the rear wheels to be in drag rotation, and the electric motor 2129 to separate from the rear wheels. The motor is released from forced rotation due to the rotation of the rear wheels (positive rotation during forward movement drive or reverse rotation during roll back).

When, without relation to a predetermined speed after the aforementioned starting, drive torque during drive is enlarged, the engagement of clutch system 13A due to the rotation of the electric motor further improves the drivability over a step or a recess and the acceleration property of the vehicle.

According to the embodiment, rear differential 1A, as described above, has ball bearings 9 interposed between ring gear 5A and differential housing 7A. Thus, during two-wheel drive where clutch system 13A, ring gear 5A and differential housing 7A do not directly contact, allowing rotational resistance to be remarkably small.

In the embodiment, clutch system 13A is located between the inner periphery of ring gear 5A and the outer periphery of differential housing 7A. The left and right drive shafts are supported only by differential housing 7A. Thus, in contrast to the conventional art, there is no necessity for the left and right drive shafts to be supported by ring gear 5A, and the absence of slide-contact between them in two-wheel drive allows a rotational resistance to be significantly smaller.

The overlapping of the gear part 5Aa of ring gear 5A and ball bearings 9 at an axial position allows the interlocking reactive force of ring gear 5A to be supported on ball bearings 9. This prevents any galling and seizing of ring gear 5A and differential housing 7A.

The absence of slide-contact between ring gear 5A and differential housing 7A and at the supporting portion of the drive shafts prevents galling and seizing.

Thus, ring gear 5A and differential housing 7A do not interlock due to galling and seizing, and the separating function of the rear wheels during two-wheel drive is ensured. This prevents the lowering of fuel-cost resulting from drive resistance due to the drag rotation of the rear-wheel drive system and restricts galling and seizing around the drive shafts. Thus, this improves the differential function of differential mechanism 11 and the turning and steering properties of the vehicle.

Galling and seizing do not generate around the drive shafts. In contrast to the conventional art, a specifically high level of an oil in the casing (casing 15) is unnecessary, thus minimizing the amount of a sealed oil.

Even if oil seal 45 is damaged, oil does not leak out, thus retaining the advantage even in a failure mode.

The reduction of the amount of an oil allows the lightening of reduction mechanism 3 and rear differential 1A, thus resulting in lower production cost.

The small rotational resistance between ring gear 5A and differential housing 7A, the absence of a slide resistance around the drive shafts, and the small amount of an oil as a rotational resistance (agitating resistance) of each rotational member allow drag torque to be significantly small. This improves fuel-cost and turn properties due to the drag torque.

In the embodiment, the four-wheel drive vehicle, using the electric motor as an auxiliary drive force, does not lock due to galling and seizing. If, during two-wheel drive or when climbing a slope, roll-back phenomenon occurs, clutch system 13A allows the electric motor to be securely separated from the rear wheels. This electromotive force prevents the application of a large load to the battery, the alternator, or the elements of the control circuit.

Thus, these functions are maintained and durability improves remarkably.

The absence of locking causes the rotation of the rear wheels not to force the rotation of the electric motor. This reduces the load, the temperature rise applied to the coil at a rotor or a magnetic field and the load applied to the bearings. This remarkably improves the durability of the electric motor.

In the brush-type electric motor, the improvement of the durability of a brush reduces the number of replacement of the brush. This reduces a maintenance cost remarkably.

Without drag torque causing the electric motor to be mechanically rotated, the battery, alternator, and a circuit elements are protected, and the durability of the electric motor is improved.

In the embodiment, rear differential 1A has clutch system 13A on the outer periphery of differential housing 7A. In contrast to the conventional art where the outer periphery of an outer casing (boss) and the inner periphery of an inner casing have a multiplate-clutch located therebetween, the enlargement of the size and torque volume of clutch system 13A allows the transmission of large torque.

The arrangement of ball bearings 9 and clutch system 13A in axial alignment with each other allows them to be small-sized. Thus, the interference of casing 15 with the second shaft 319 of reduction mechanism 3 is prevented, thus improving the equipability of a vehicle and enlarging the load clearance of a vehicle body.

The dimensional allowance due to the small-sization allows clutch system 13A to be further large-sized, thus enlarging its torque volume.

The large-sization of clutch system 13A reduces the load to be applied to the frictional face due to the enlargement of torque at the identical volume, thus improving durability.

The amplification of the pressing force against primary clutch 49 by ball cam 53 causes primary clutch 49 to obtain a sufficient clutch volume even at a small-size and a light weight. This allows a sufficient drive force to be transmitted to rear wheels.

The provision of ball cam 53 for the amplification of the pressing force of primary clutch 49 allows the clutch system to be small-sized, compared to one of identical volume without the amplifying mechanism. This results in an even more compact rear differential 1A, thus improving the equipability of the vehicle.

The primary clutch 49 is warmed due to the heat of electromagnet 47 (coil 87). This, when clutch system 13A is disengaged, allows for the reduction of the drag torque of the rear wheels generated due to the viscosity of an oil at a low temperature. This reduces the loss in the drive force of the engine, thus improving fuel cost.

The multi-plate type primary clutch 49 and pilot clutch 51A are employed in clutch system 13A. This prevents the generation of a ratchet sound from the dog clutch allowing for a high silent property, and a release from shock and shock sound during engagement and disengagement.

Clutch system 13A using multi-plate type primary clutch 49 and pilot clutch 51A does not require the synchronization of the rotation during engagement and disengagement. The lack of necessity of a synchronization mechanism allows rear differential 1A to be light and compact at a low production cost.

Rear differential 1A, as described above, has rotor 61A supported by differential housing 7A located inside of but not being supported by housing 23.

Ball cam 53, as shown in FIG. 1, is located close to a rotational axis. The distance L2 from the functional point receiving its cam thrust force to the support point (fulcrum) of the rotor is significantly shorter than the conventional one. This allows the torque generated by the cam thrust force to be reduced.

Thus, the necessary strength of rotor 61A is small, allowing lightening.

The small load of rotor 61A allows openings 105 and bridges 107 between radial outer and inner parts 101, 103 to be alternately formed as a bridge structure. The result causes rotor 61a to be one piece structure, thus, in contrast to the three-piece structure of the conventional rotor, allowing lightening at a low production cost.

The space 115 between outer plates 51Ab of pilot clutch 51A and cam ring 65, the space 117 between inner plates 51Aa and clutch housing 23, and the space 119 between armature 73A and clutch housing 23 cause the magnetic loss of electromagnet 47 to be small and the attractive force of armature 73A to be strong. This improves the operational response of clutch system 13A.

In accordance with the small loss of magnetic force, electromagnet 47 becomes small-sized, thus improving the fuel cost of the engine.

The spaces 115, 117, 119 as oil passages improve the lubricating and cooling properties of pilot clutch 51A, ball cam 53, and primary clutch 49.

Armature 73A and clutch housing 23 have space 119 provided therebetween, reducing the leakage of magnetic force toward clutch housing 23. This allows the omission of a leakage preventing member of magnetic flux such as a non-magnetic member welded to a differential housing (for the prevention of the leakage of magnetic flux) according to the conventional art. Thus, the structure of the housing is simplified and costs are kept low.

The aforementioned embodiment shows an example adapted to the differential of the four-wheel drive vehicle which is constituted with the engine as a primary drive source and the electric motor as an auxiliary drive source. However, without being limited to the adapted example, the differential of the invention is also preferably employed, to the drive wheels of four-wheel drive vehicle with an engine as a drive force, which are separate during two-wheel drive.

In this case, this obtains the similar benefits except for the ones of the electric motor.

In the embodiment, ring gear 5A, differential housing 7A, ball bearings 9 are overlapped at an axial position. However, a partial overlap of them at an axial position would obtain a similar function.

The bearing 9 employs a ball bearing as an example, and, without being limited to this, preferably uses a sliding bearing.

The operating mechanism of the pilot clutch, without being limited to the electromagnet, preferably employs a fluid-hydraulic actuator such as a oil-hydraulic actuator or an electric motor.

The main and pilot clutches preferably employ a multi-plate clutch or, for example, a single-plate clutch or corn clutch as a frictional clutch. They are preferably either of a wet or dry type.

The multi-plate and single-plate clutches employ a steal, a carbon, or a paper as a clutch plate.

The differential mechanism, without being limited a bevel type, employs, for example, a planetary gear type, a worm gear type, or a differential mechanism where a pinion gear, housed slidably in the housing opening of a differential housing, connects output side gears.

The differential of the invention, without limiting the constitution (F.R.D) where the clutch system of the embodiment connects or disconnects a drive force, is preferably adapted to the constitution (L.S.D.) where a clutch mechanism limits differential motion.

In the L.S.D., an internal rotational member as a differential rotational member such as side gears and the arrangement of the primary clutch between a torque transmission member and an internal rotational member obtains a differential limiting function for limiting a differential motion of a differential mechanism. The supporting of the rotor on the internal rotational member allows for adaptation of the invention.

The differential of the embodiment is preferably employed to a front differential adapted to the four-wheel drive vehicle where front wheels separate from a drive source during two-wheel drive.

Second Embodiment

As shown in FIG. 5, spring pins 39 fasten pinion shaft 31 to differential housing 7A. In rear differential 1B, the right end of differential housing 7A has a rotor 61B of magnetic material as a side wall. The rotor 6B is spline linked to clutch housing 23, being axially positioned by snap ring 63 fixed to the inner periphery of housing 23.

Rotor 61B constitutes part of the magnetic circuit of electromagnet 47. Rotor 61B and core 57 have air gap G1 at a predetermined width as a part of the magnetic circuit, provided therebetween. Rotor 61B has ring 71 of stainless steel (non-magnetic material) which magnetically breaks off between the radial outer and inner portions, thus preventing magnetic short circuit.

Pressure plate 67 and pilot clutch 51B have an axially movable armature 73B provided therebetween.

Third Embodiment

Figure 6:
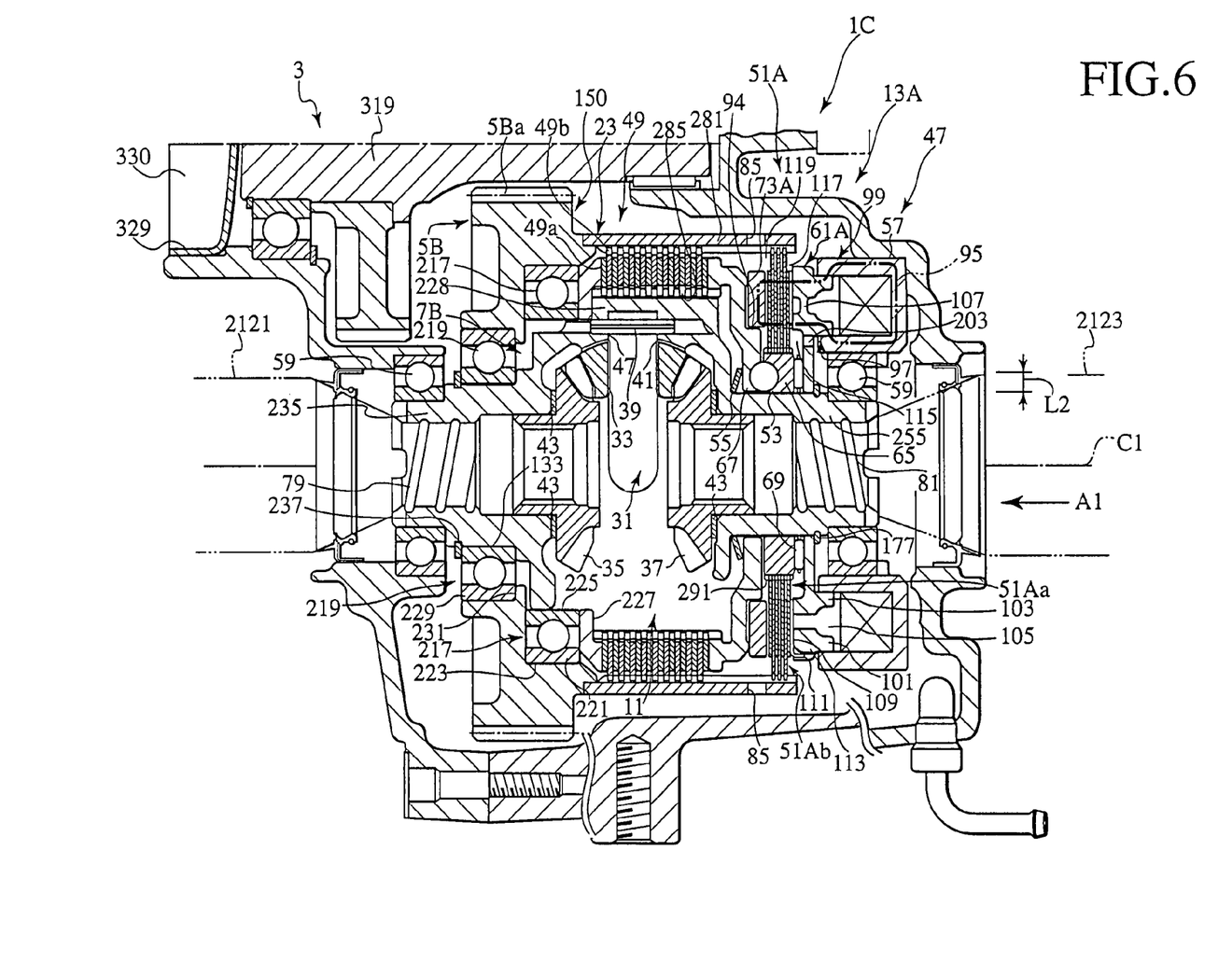
FIG. 6 is a sectional view of a differential according to a third embodiment of the invention, where a differential is sectioned along two directions at a right angle from an axis.

As shown in FIG. 6, rear differential 1C is constituted with: housing 150 (torque transmission member); differential housing 7B located radially inward of the housing 150; bevel gear type differential mechanism 11; clutch system 13A; rotor 61A constituting a part of system 13A.

Rear differential 1C is housed in casing 15. Casing 15 has an oil reservoir therein.

Housing 150 is constituted with ring gear 5B and clutch housing 23. Clutch housing 23 is press manufactured, being welded to ring gear 5B.

Ring gear 5B is supported to differential housing 7B, using large-sized and small-sized ball bearings 217, 219. Ring gear 5B has helical gear 5Ba to be meshed with, for example, the mating helical gear connected to the propeller shaft of the rear wheels.

Housing 150 transmits a torque from ring gear 5B, resulting in a floating structure, which is released from the supporting function of a member.

Ring gear 5B gives axial rightward interlocking thrust force to housing 150 due to its helix angle during a forward drive of the vehicle, while giving axial leftward interlocking thrust force during the backward drive.

Outer race 221 of ball bearing 217 is positioned axially leftward on the stepped part 223 of ring gear 5B. Inner race 225 is positioned axially rightward on stepped part 228 of differential housing 7B.

Outer race 229 of ball bearing 229 is positioned radially and rightwardly on stepped part 231 of ring gear 5B. Inner race 233 thereof is positioned on snap ring 237 mounted to left boss 235 of differential housing 7B.

Snap ring 237 has an adequate strength for a sufficient positioning function and for self-destruction upon receiving more than a predetermined thrust force.

The left boss 275 of differential housing 7B is supported to casing 15, using ball bearing 59. Right boss 277 is supported to casing 15, using ball bearing 59 and core 57.

Primary clutch 49 is interposed between housing 150 (member 23) and differential housing 7B. Outer plates 49b thereof are linked to spline 281 provided on the inner periphery of clutch housing 23. Inner plates 49a thereof are linked to spline 285 provided on the outer periphery of differential housing 7B.

Pilot clutch 51A is interposed between clutch hosing 23 and cam ring 65. Outer plates 51Ab thereof are linked to spline 281 of clutch housing 23. Inner plates 51Aa thereof are linked to spline 291 provided to the outer periphery of cam ring 65.

Spline 281 is manufactured when clutch housing 23 is manufactured, passing through clutch housing 23 and reaching its right end.

Rotor 61A and pilot clutch 51A have washer 109 interposed therebetween for the improvement of the abutting of pilot clutch 51A against rotor 61A formed with opening 105. Washer 109 is mounted to rotor 61A, with its three claws being bent in recess 113 formed to the outer periphery of rotor 61A.

When, for example, a gear box or a bearing is seized between the engine and rear differential 1B, the drive rotation of the rear wheels causes ring gears 5B of housing 150 to be rotated, leading the mating helical gear.

In this state, the direction of the torque, to be transmitted between ring gear 5B and the mating helical gear, is identical to one of rear drive. As mentioned above, the meshing of the helical gears generates thrust force for the movement of housing 150 leftwardly.

As mentioned above, snap ring 237 for positioning of ball bearing 219 is adjusted at an adequate strength. The receiving of the thrust force through ball bearing 219 causes the destruction of snap ring 237, the leftward movement of housing 150. The movement causes outerplates 51Ab to be separated from spline 281 of clutch housing 281.

When outer plates 51Ab is separated from spline 281, similar to the disengagement of pilot clutch 51A, the disappearance of the cam thrust force of ball cam 53 causes primary clutch 49 to be disengaged, thus separating the rear wheels.

Thus, even when seizing occurs in the engine when in four-wheel drive, the rear wheels are automatically separated. The receiving of the rotation of the rear wheels does not deteriorate the damaged seizing portion, thus improving a failure mode.

When clutch system 13A is disengaged (two-wheel drive mode), inner plates 51Aa of pilot clutch 51A, pressure plate 67, armature 73A, cam ring 65 (ball cam 53), thrust bearing 69, and rotor 61A rotate together with differential housing 7B. Pilot clutch 51A and outer plate 51Ab rotate together with housing 150.

With the constitution, when outer plates 51Ab are located facing armature 73A, during two-wheel drive, the drive force is transmitted from outer plates 51Ab to armature 73A due to the friction therebetween. This causes the rear wheels to be dragged, thus lowering a fuel cost due to energy loss. The rear differential 1C, however, is arranged of facing inner plates 51Aa and armature 73A. No transmission of drive force due to friction prevents the drag of the rear wheels or the lowering of fuel cost.

If rotor 61A is supported by housing 150, during a two-wheel drive, the rotation force of cam ring 65 of differential housing 7B relative to rotor 61A of housing 150 is applied to thrust bearing 69, thus reducing durability. However, in rear differential 1C, in which rotor 61A is supported to differential housing 7B, thrust bearing 69 is released from the relative rotation, thus preventing the lowering of durability.

The support of rotor 61A by differential housing 7B causes housing 150 and clutch housing 23 to be separated from each other. Without the necessity of supporting rotor 61A, housing 150 is also released from the supporting of a member located inside thereof, thus allowing reduction of strength and lightening.

Housing 150, released from the role of supporting member, becomes a floating structure. This reduces the need for a manufacture accuracy, thus allowing clutch housing 23 to be press manufactured.

Thus, comparing to the conventional art in which a differential housing is cut-manufactured in high accuracy after forging or molding, rear differential 1C becomes remarkably light and costs remarkably low.

The entire contents of Japanese Patent Applications P2000-211544 (filed Jul. 12, 2000), P2000-319911 (filed Oct. 19, 2000), and P2001-74746(filed Mar. 15, 2001) are incorporated herein by reference.

While preferred embodiments of the present invention have been described using specific terms, such description is for illustrative purposes, and it is to be understood that changes and variations may be made without departing from the spirit or scope of the following claims.

What is claimed is:
1. The drive system comprising:
a reduction gear mechanism operative to transmit drive torque from a motor;
the reduction gear mechanism comprising a finally rotatable drive gear;
a differential comprising:
a differential housing supporting the drive gear and being configured to be driven by the drive gear; and
a differential mechanism supported to the differential housing;
a clutch system operative to connect the drive gear and the differential housing with each other; and
a casing supporting the differential housing, and housing the reduction gear mechanism, the differential housing, the clutch system, and the differential mechanism therein,
wherein the casing reserves an oil therein,
wherein the differential housing defines a first opening,
wherein the differential housing has therein a space in fluid communication with a space within the casing through the first opening and across the drive gear,
wherein the clutch system comprises:
a clutch mechanism;
an electromagnet operative to produce clutch-operation force for the clutch mechanism;
a clutch housing integrally rotatably connected to the drive gear; and
a rotor between the clutch housing and the differential housing,
wherein the clutch housing and the differential housing are spaced from each other.

2. The drive system of claim 1,
wherein the drive gear includes a second opening,
wherein the casing and the differential housing have therein spaces in fluid communication with each other through respective first and second openings, respectively.

3. The drive system comprising:
a reduction gear mechanism operative to transmit drive torque from a motor;
the reduction gear mechanism comprising a finally rotatable drive gear;
a differential comprising:
a differential housing supporting the drive gear and being configured to be driven by the drive gear; and
a differential mechanism supported to the differential housing;
a clutch system operative to connect the drive gear and the differential housing with each other; and
a casing supporting the differential housing, and housing the reduction gear mechanism, the differential housing, the clutch system, and the differential mechanism therein,
wherein the casing reserves an oil therein,
wherein the differential housing defines a first opening.
wherein the differential housing has therein a space in fluid communication with a space within the casing through the opening and across the drive gear,
wherein the clutch system comprises:
a clutch mechanism;
an electromagnet operative to produce clutch-operation force for the clutch mechanism; and
a rotor between the drive gear and the differential housing and defining a first opening.

4. The drive system comprising:
a reduction gear mechanism operative to transmit drive torque from a motor;
the reduction gear mechanism comprising a finally rotatable drive gear;

a differential comprising:
a differential housing supporting the drive gear and being configured to be driven by the drive gear; and
a differential mechanism supported to the differential housing;
a clutch system operative to connect the drive gear and the differential housing with each other; and
a casing supporting the differential housing, and housing the reduction gear mechanism, the differential housing, the clutch system, and the differential mechanism therein,
wherein the casing reserves an oil therein,
wherein the differential housing defines an opening,
wherein the differential housing has therein a space in fluid communication with a space within the casing through the opening and across the drive gear,
wherein the differential housing comprises a boss supported to the casing using a bearing,
wherein the differential mechanism connects with a drive shaft extending through an inner periphery of the boss and the casing,
wherein an outer periphery of the drive shaft and an inner periphery of the boss define an oil passage therebetween,
wherein the casing and the differential housing have therein spaces in fluid communication with each other through the oil passage, respectively.

5. The drive system of claim 3,
wherein the clutch system comprises a clutch housing integrally rotatably connected to the drive gear and defining a second opening.

6. The drive system of claim 1,
wherein the clutch system comprises a clutch housing integrally rotatably connected to the drive gear and including a tubular part,
wherein the tubular part has an end defining a second opening inside thereof.

7. The drive system of claim 1,
wherein the first opening is located radially outside of the differential mechanism.

8. The drive system of claim 3, wherein the first opening is located radially outside of the differential mechanism.

9. The drive system comprising:
a reduction gear mechanism operative to transmit drive torque from a motor;
the reduction gear mechanism comprising a finally rotatable drive gear;
a differential comprising:
a differential housing supporting the drive gear and being configured to be driven by the drive gear; and
a differential mechanism supported to the differential housing;
a clutch system operative to connect the drive gear and the differential housing with each other; and
a casing supporting the differential housing, and housing the reduction gear mechanism, the differential housing, the clutch system, and the differential mechanism therein,
wherein the clutch system comprises:
a clutch mechanism;
an electromagnet operative to produce clutch-operation force for the clutch mechanism;
a clutch housing integrally rotatably connected to the drive gear; and
a rotor provided as a side wall of the clutch housing.

10. The drive system comprising:
a reduction gear mechanism operative to transmit drive torque from a motor;
the reduction gear mechanism comprising a finally rotatable drive gear;
a differential comprising:
a differential housing supporting the drive gear and being configured to be driven by the drive gear; and
a differential mechanism supported to the differential housing;
a clutch system operative to connect the drive gear and the differential housing with each other; and
a casing supporting the differential housing, and housing the reduction gear mechanism, the differential housing, the clutch system, and the differential mechanism therein,
wherein the differential housing includes a boss supported to the casing using a bearing,
wherein the clutch system comprises:
a clutch mechanism;
an electromagnet operative to produce clutch-operation force for the clutch mechanism;
a clutch housing integrally rotatably connected to the drive gear;
a rotor integrally rotatably connected to the clutch housing and being located outside of the boss; and
an armature located axially opposite the electromagnet relative to the rotor.

11. The drive system of claim 9, wherein the clutch housing has the clutch mechanism located inside thereof, and defines an opening.

12. The drive system of claim 10, wherein the motor comprises an electric motor fixed to the differential housing.

13. A differential comprising:
a drive gear;
a differential housing having axially opposed ends rotatably supported to a stationary member, the differential housing rotatable relative to the drive gear, rotatably supporting the drive gear and being operative to be driven by the drive gear;
a differential mechanism housed in the differential housing and being rotatable by the differential housing;
a clutch operative to interconnect the drive gear and the differential housing with each other; and
an electromagnet configured to control the clutch to be engaged and disengaged,
wherein the electromagnet is located coaxially with a drive shaft, axially outside of the differential mechanism and within the stationary member,
wherein an oil included within the stationary member circulates through oil passages within the clutch and the differential housing and an oil passage between an outer periphery of the drive shaft and the differential housing.

14. A differential system comprising:
a drive gear;
a differential housing having axially opposed ends rotatably supported to a stationary member, the differential housing being rotatable relative to the drive gear, rotatably supporting the drive gear and being operative to be driven by the drive gear;
a differential mechanism housed in the differential housing and being rotatable by the differential housing;
a clutch system including a clutch operative to interconnect the drive gear and the differential housing with each other; and an oil passage to circulate oil among an interior of the differential housing, an exterior of the differential housing, an interior of the clutch system, and an exterior of the clutch system, the oil passage including:

an opening penetrating the differential housing to spatially link the interior of the differential housing with the interior of the clutch system, an aperture formed on the clutch system to spatially link the interior of the clutch system with the exterior of the clutch system and the exterior of the differential housing, and a channel formed on an inner periphery of the differential housing to permit flow of the oil between the exterior of the differential housing and the interior of the differential housing.

15. The differential system of claim 14, further comprising:

an electromagnet configured to control the clutch to be engaged and disengaged, wherein the electromagnet is located coaxially with the drive shaft, axially outside of the differential mechanism and within the stationary member.

16. The differential system of claim 14, further comprising a reduction gear drivingly linking with the drive gear.

17. The differential system of claim 14, wherein the opening, the aperture and the channel are interlinked so as to conduct oil in the order of the opening, the aperture, and the channel.

18. The differential system of claim 14, wherein the clutch system further includes a clutch housing fixed with the drive gear, an electromagnet configured to control the clutch to be engaged and disengaged, and a rotor configured to constitute a magnetic path for the electromagnet and fixed on the differential mechanism.

* * * * *